United States Patent [19]

Kitugawa

[11] Patent Number: 5,577,975
[45] Date of Patent: Nov. 26, 1996

[54] VARIABLE SPEED CHANGING GEAR

[76] Inventor: Mituo Kitugawa, 1-10-302, Tajima 6-chome, Urawa-shi, Saitama-ken, Japan

[21] Appl. No.: 305,215

[22] Filed: Sep. 12, 1994

[30] Foreign Application Priority Data

Sep. 28, 1993 [JP] Japan .................... 5-241404

[51] Int. Cl.⁶ ..................... F16H 15/00; F16H 17/00
[52] U.S. Cl. ................... 475/166; 74/116; 475/186
[58] Field of Search .............. 74/116, 117; 475/183, 475/185, 186, 162, 165, 166

[56] References Cited

U.S. PATENT DOCUMENTS 4,044,620  8/1977  F'Geppert ................ 475/185 X

FOREIGN PATENT DOCUMENTS

| 5-52247 | 3/1993 | Japan . | |
|---|---|---|---|
| 0449190 | 11/1974 | U.S.S.R. | 475/183 |
| 0516853 | 6/1976 | U.S.S.R. | 475/185 |

Primary Examiner—Charles A. Marmor
Assistant Examiner—Saul Rodriguez
Attorney, Agent, or Firm—Klarquist Sparkman Campbell Leigh & Whinston, LLP

[57] ABSTRACT

A variable speed changing gear has an internal friction wheel made of elastic material and a cycloid wheel inscribed to the internal friction wheel. The cycloid wheel is rotated for circulating along the internal friction wheel. Because of the elastic material, the effective radius of the internal friction wheel is changeable by giving force to the cycloid wheel in the radial direction. The circulation speed of the cycloid wheel is changed in reverse proportion to the radius. The output shaft can be rotated with variable speed following to the circulation of the cycloid wheel. This speed changing gear can be operated as a load compensating device.

2 Claims, 4 Drawing Sheets

VARIABLE SPEED CHANGING GEAR

This invention relates to a variable speed changing friction gear for driving of machinery.

Generally in such a gear of the prior art, in order to change the speed ratio, a rotating wheel contacts with another power transmitting means through a point of contact which defines a working radius of the rotating wheel, and the working radius is changed by shifting the point of contact along the frictional surface of the rotating wheel.

One of the objects of the present invention is to provide a variable speed changing gear having an elastic friction wheel so that changing of the effective radius of the friction wheel is performed by causing elastic deformation.

Another object of the present invention is to provide a load compensating variable speed changing gear in which the effective radius of the friction wheel is automatically changed according to the load fluctuation on the output shaft.

A further object of the present invention is to provide a variable speed changing gear which is regulated by hydraulic means.

These and other objects and advantages of the present invention will become clear from the following description which reference to the accompanying drawings, wherein.

Referring now in particular to these drawings, wherein like reference characters designate like or corresponding parts throughout.

Now the present invention will be described in detail, in connection with the following examples:

EXAMPLE 1

Figure 1:
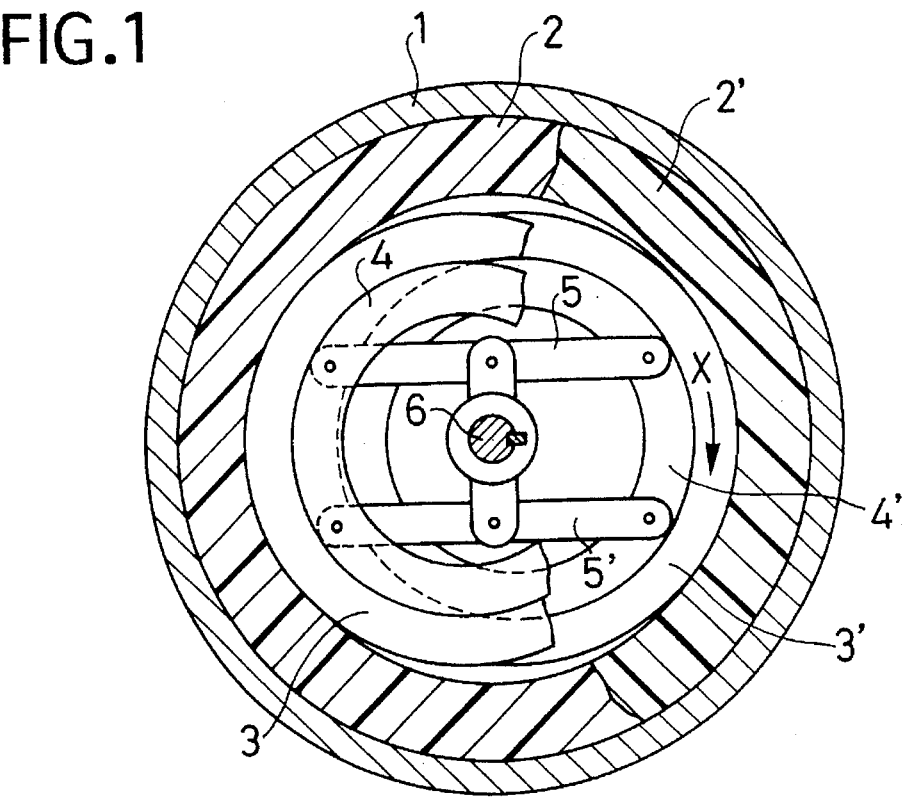
FIGS. 1, 2 are sectional elevations of example 1 according to the present invention.
Figure 2:
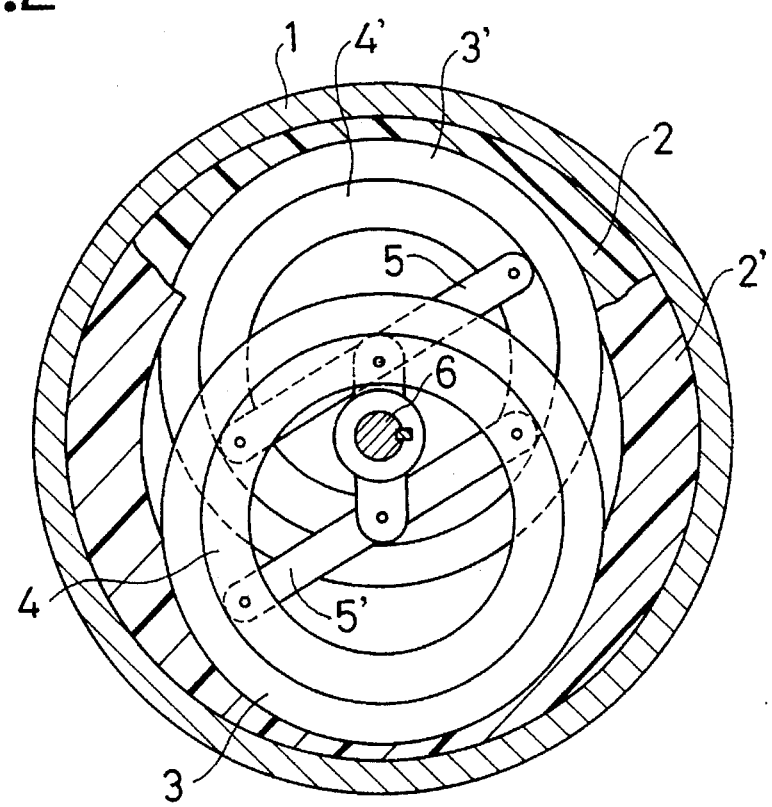

As shown in FIG. 1 and FIG. 2, example 1 of the variable speed changing gear according to the present invention has a cylindrical shell frame 1 formed as a stationary body of this gear. Inside of the cylindrical shell frame 1, a pair of internal friction wheel 2, 2' are Fixedly disposed adjacently with a short aparting distance so that the internal friction wheels 2, 2' define the centerline of this speed changing gear. These internal friction wheels 2, 2' are made of elastic material such as rubber or the like other resilient material. A pair of cycloid wheels 3, 3' formed each in a shape of a circular ring are rotatively inscribed to the internal surfaces of the respective internal friction wheels 2, 2' for being driven along this internal surfaces. The cycloid wheels 3' is formed suitable for engaging with an offset coupling on the input shaft not shown in either of FIG. 1 and 2. The cycloid wheels 3, 3' are mounted each on a ring shape retainer 4, 4' in a freely rotative manner. Both the retainers 4, 4' are linked one another with a pair of parallel links 5, 5' to provide a short center distance between the cycloid wheels. But, as referred to FIG. 2, the cycloid wheels 3, 3' together with thus linkaged retainers 4, 4' are movable one another to change the center distance when the parallel links 5, 5' are turned relative to the retainers 4, 4'. The parallel links 5, 5' are further linkaged with an output shaft 6 which is provided in alignment with the centerline of this speed changing gear so that the cycloid wheels 3, 3' are always positioned on the respective internal friction wheels 2, 2 symmetrically with respect to the centerline of the speed changing gear as shown in FIG. 1 and FIG. 2. Further, an input shaft not shown is provided in alignment with the centerline of the changing gear. The input shaft is attached with an off-set coupling such as known Oldham's coupling or the like to drive the cycloid wheel 3' so that the cycloid wheel 3' can be rotated and driven circulately along the internal surface of the internal friction wheels 2'. By this movement of the cycloid wheel 3', the other cycloid wheel 3 is also driven circulately along the internal surface of the other internal friction wheel 2. in this configuration, the internal diameters of the internal friction wheels 2, 2' are preferably same to the diameters of the cycloid wheels 3, 3'. Therefore, the internal friction wheels 2, 2' are always elastically deformed due to contact of the cycloid wheels 3, 3', and the necessary contact pressure for frictional drive is sufficiently kept on each cycloid wheel 3, 3'. It should be noted that, if the cycloid wheels 3, 3' are not rotated, the center distance between the cycloid wheels 3, 3' is kept in the minimum length by the resilient reaction pressure from the internal friction wheels 2, 2 '. Now, when the cycloid wheel 3' is rotated clockwise as allow marked in FIG. 1 by the input shaft through the offset coupling, the cycloid wheel 3' is driven circulately along the internal friction wheel 2' so that another cycloid wheel 3 is also driven circulately along the internal Friction wheel 2 with turning of the parallel links 5, 5'. By this turning of the parallel links, the output shaft 6 is rotated while the center distance between the cycloid wheels 3, 3' is kept in the minimum length. In this stage of operation, the cycloid wheels 3, 3' are circulated with the minimum radius of the circulating motion. However,if the output shaft 6 does not rotate by resistance due to a heavy load thereon, only the parallel links 5, 5' rotate around the output shaft 6 so that the center distance between the cycloid wheels 3, 3' is extended as shown in FIG. 2. According to extending of the center distance, both the cycloid wheels receive growing resilient reaction pressure from the internal friction wheels 2, 2'. This grown up resilient reaction pressure gives growing force to the parallel links 5, 5' for driving the output shaft 6 in opposition to the heavy load, as will be understand from FIG. 2. Consequently, the output shaft 6 starts to rotate. But, because the center distance between the cycloid wheels 3, 3' was extended, the circulating speed of the cycloid wheels 3, 3' is so lowered in comparison with that before extending the center distance between the cycloid wheels 3, 3'. Thus, the rotating speed of the output shaft 6 is low when heavy load is loaded on the output shaft 6, and is high when light load. Further, if the load on the output shaft 6 is decreased during rotating, the center distance between the cycloid wheels 3, 3' is reduced by the resilient reaction pressure from the internal friction wheels 2, 2' and the rotating speed the output shaft 6 is increased in reverse proportion to the length of the center distance between the cycloid wheels 3, 3'. Above described operation shows that both the output torque and the rotating speed of the output shaft 6 are respectively changed automatically in response to the load fluctuation on the output shaft 6.

As set forth, it will be understand that the effective radius of the internal friction wheel is changed according to extension of the circulating radius of the cycloid wheel.

EXAMPLE 2

Figure 3:
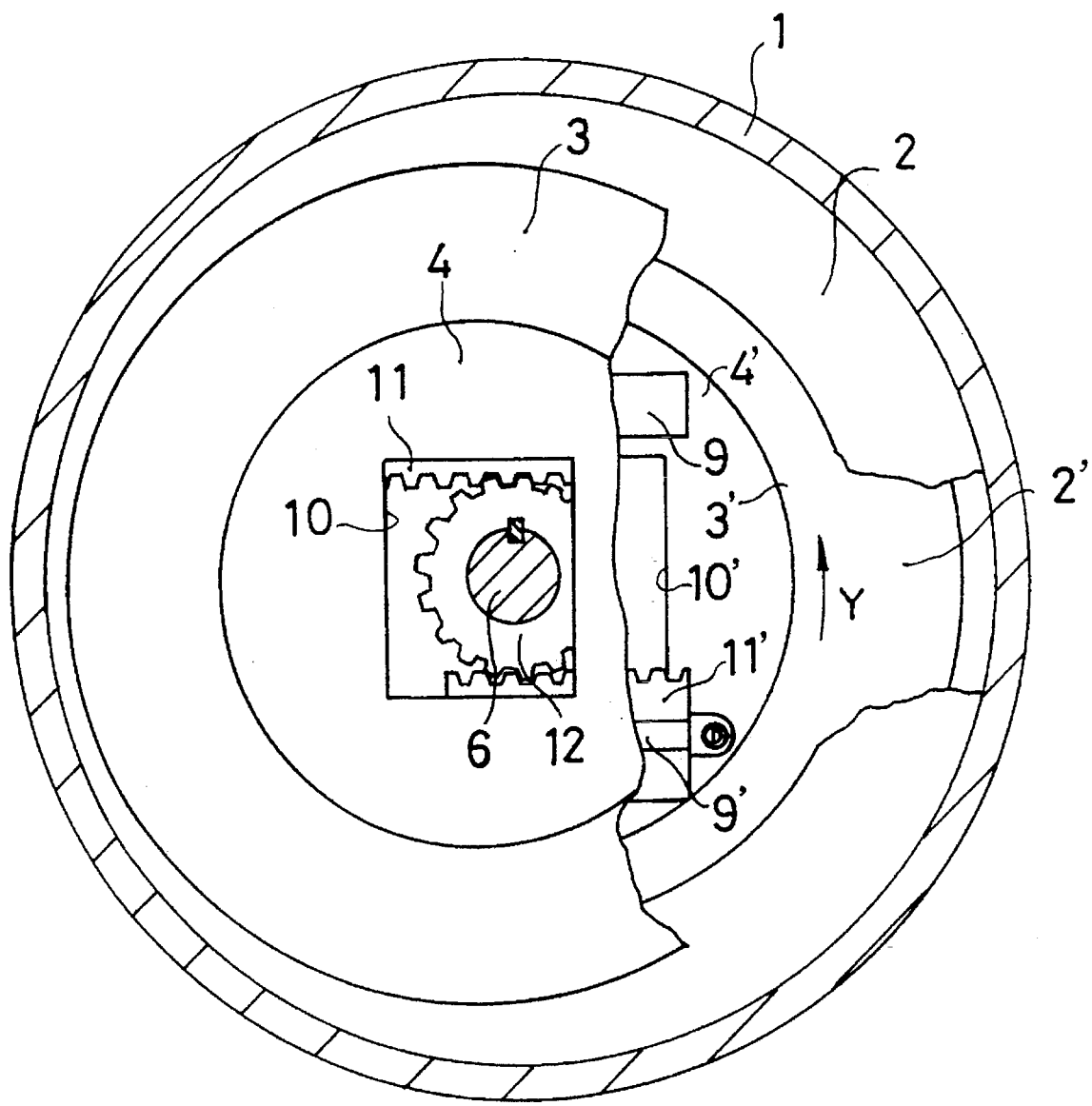
FIG. 3 is a sectional elevation of example 2 according to the present invention.
Figure 4:
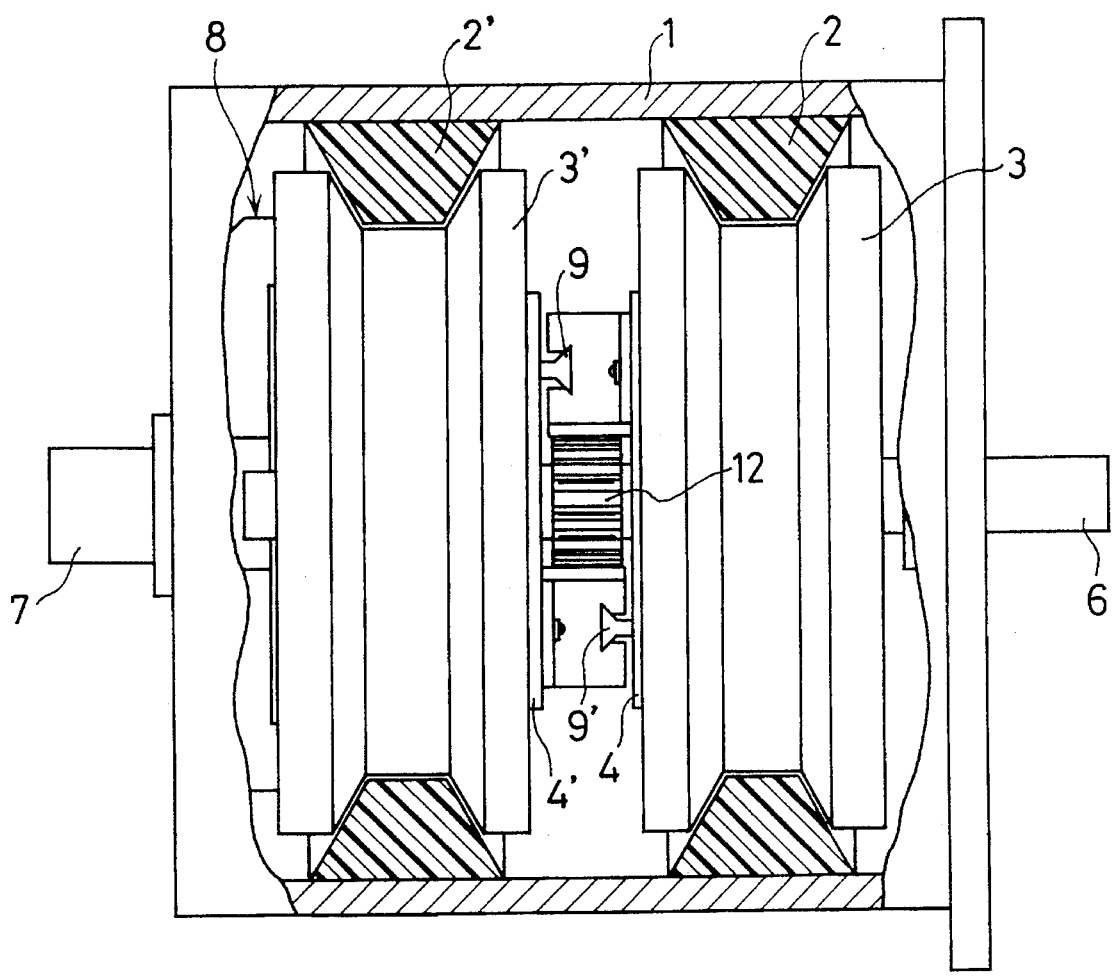
FIG. 4 is a side elevation of the example 2.

As shown in FIGS. 3 and 4, example 2 of the variable speed changing gear according to the present invention has a cylindrical shell frame 1, a pair of internal friction wheels 2, 2' made of elastic material, a pair of cycloid wheels 3, 3', and an output shaft 6. And further, the example 2 is provided with an input shaft 7 attached with an offset coupling 8 for driving the cycloid wheel 3' as referred to the description of the example 1. The cycloid wheels 3, 3' are each mounted on and freely rotative around a disc shape retainer 4, 4'. The retainer 4, 4' are jointed one another by a pair of prismic guides 9, 9' so that the cycloid wheels 3, 3' move to and fro one another as guided by the prismic guides 9, 9'. And further, each disc shape retainer 4, 4' has a square opening 10, 10' and a pinion rack 11, 11' attached on the edge of the opening 10, 10' so as to install these pinion racks 11, 11' in parallel to the prism guide 9, 9'. Thus installed both the pinion racks 11, 11' are in mesh with a pinion 12 which is mounted on the output shaft 6 extended through both the square openings 10, 10'. In this configuration, as referred in FIG. 3, if the cycloid wheel 3' is rotated counter-clockwise by the input shaft 7 through the offset coupling 8, the cycloid wheel 3' circulates clockwise along the internal friction wheel 2' so that the other cycloid wheel 3 also circulates along the internal friction wheel 2. In this operation, if there is a heavy load on the output shaft 6, the pinion 12 does not rotate due to this heavy load. In such a case, both the cycloid wheels 3, 3' together with the retainers 4, 4', are circulated around the pinion 12, while the pinion racks 11, 11' are in mesh with the pinion 12 so that the center distance between the cycloid wheels 3, 3' is extended in opposition to the resiliental reaction pressure from the internal friction wheels 2, 2'. Although other performances of this example 2 are equivalent to those of the example 1, in comparison with that of the example 1, the reaction pressure of the example 2 is generated so proportional to the load on the output shaft 6, because the pinion 12 can receive the reaction forces from the pinion racks 11, 11' which are arranged each in the tangential direction of the pinion.

EXAMPLE 3

Figure 5:
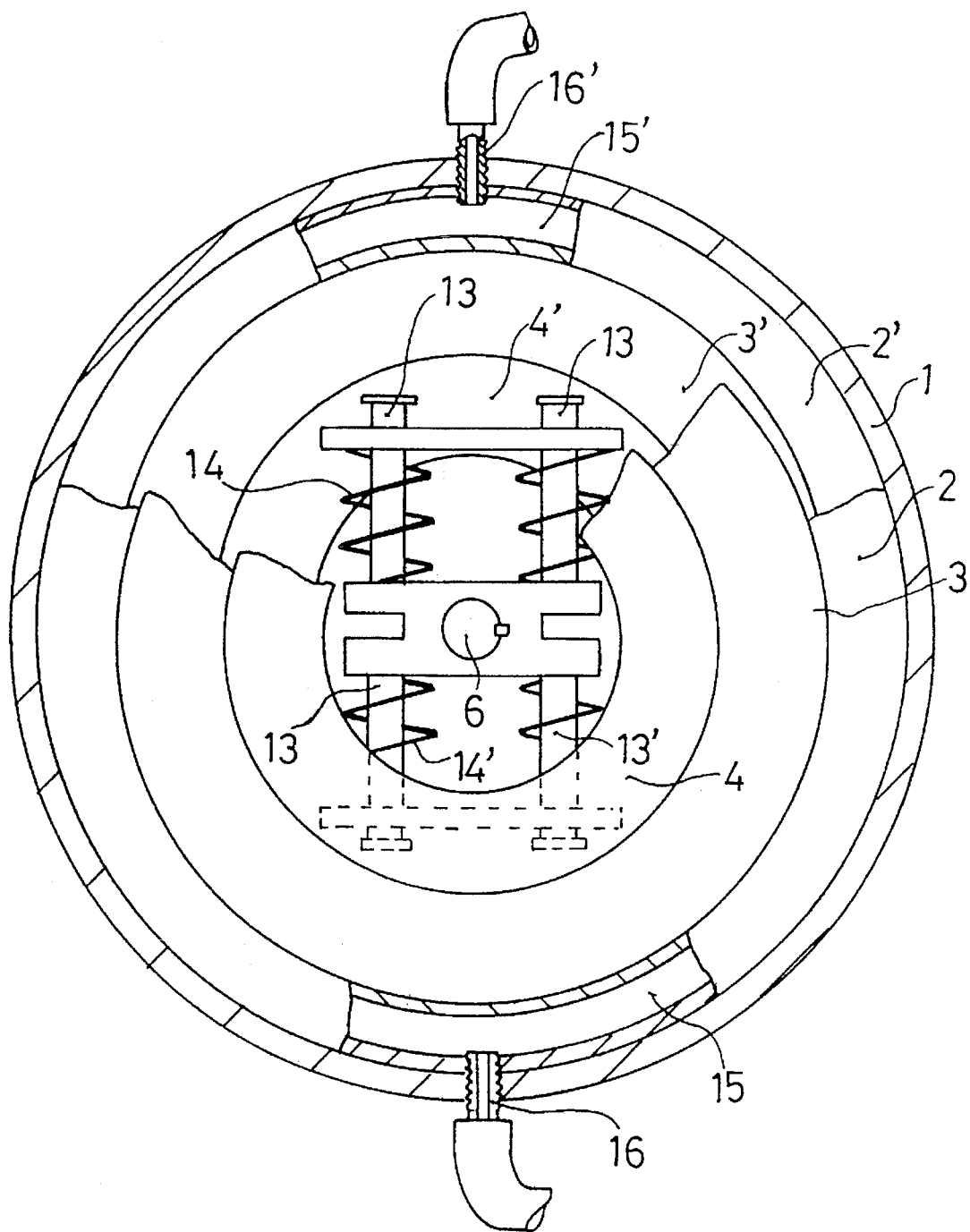
FIG. 5 is a sectional elevation of example 3 according to the present invention.

Refer to accompanied drawing FIG. 5 showing example 3 of a variable speed changing gear according to the present invention. The example 3 has a cylindrical shell frame 1, a pair of internal friction wheel 2, 2' made of elastic material, a pair of cycloid wheels 3, 3' each rotative around a retainer 4, 4', an output shaft 6 and an input shaft attached with an offset coupling as those arranged in the examples 1 and 2. However, the retainers 4, 4' are each movably guided along guide rods 13, 13' which are extended radially from the output shaft 6. These retainers 4, 4' are enforced outward each by springs 14, 14' so that the cycloid wheels 3, 3' contact each with the respective internal friction wheels 2, 2'. In this configuration, the internal friction wheels 2, 2' enclose each a circular elastic tube 15, 15' like an automobile tire tube. The elastic tubes 15, 15' are led into a fluidic pressure source not shown through pipe joints 16, 16'. The rubber tubes 15, 15' are inflated by fluidic pressure so that both the cycloid wheels 3, 3' are pushed inward opposing the spring actions of the springs 14, 14'. As will be easily understand, the positions of the cycloid wheels 3, 3' are changeable by adjusting the fluidic pressure so that the circulating speed of each cycloid wheel 3, 3' along the internal friction wheel 2, 2' is changed. Therefore, rotating speed of the output shaft is changed accordingly.

As described, the effective diameters of the internal friction wheels 2, 2' are changed by fluidic means.

What is claimed is:

1. A variable speed changing gear, comprising:

a cylindrical shell frame (1);

an internal friction ring (2) made of elastic material and fixedly mounted on the interior surface of the cylindrical shell frame (1);

a cycloid wheel (3) disposed interiorly of the friction ring (2) and rotatable by contact therewith, thereby to circulate along the interior surface of friction ring (2) with a variable circulating radius;

an input shaft (7) disposed on the centerline defined by the friction ring (2) and adapted to rotate the cycloid wheel (3);

an offset coupling (8) mounted on the cycloid wheel (3), the input shaft (7) being attached to the offset coupling (8) to rotate the cycloid wheel (3);

a retainer (4) for rotatably supporting the cycloid wheel (3); and an output shaft (6) provided on the centerline, the output shaft (6) being linked with the retainer (4) by a pair of parallel links (5, 5') for rotating the output shaft (6) by the circulation of the cycloid wheel (3), whereby the circulating radius of the cycloid wheel (3) is changeable when the parallel links (5, 5') are moved relative to the output shaft (6).

2. A variable speed changing gear, comprising:

a cylindrical shell frame (1);

an internal friction ring (2) made of elastic material and fixedly mounted on the interior surface of the cylindrical shell frame (1), the internal friction ring (2) enclosing an elastic circular tube (15);

a cycloid wheel (3) disposed interiorly of the friction ring (2) and rotatable by contact therewith, thereby to circulate along the interior surface of the friction ring (2) with a variable circulating radius;

an input shaft (7) disposed on the centerline defined by the friction ring (2) and adapted to rotate the cycloid wheel (3);

an offset coupling (8) mounted on the cycloid wheel (3), the input shaft (7) being attached to the offset coupling (8) to rotate the cycloid wheel (3);

a retainer (4) for rotatably supporting the cycloid wheel (3); and an output shaft (6) provided on the centerline, the output shaft (6) having means to support the retainer (4) in a radially movable manner so as to contact the cycloid wheel (3) with the interior surface of friction ring (2), whereby the circulating radius of the cycloid wheel (3) is changed by adjusting the fluid pressure in the elastic tube (15).

* * * * *